United States Patent [19]

Anderson et al.

[11] Patent Number: 4,955,037
[45] Date of Patent: Sep. 4, 1990

[54] APPARATUS AND METHODS FOR RECOVERING ALIGNMENT FROM A NON-IDEALLY ENCODED MULTI-BIT DIGITAL SIGNAL

[75] Inventors: Milton M. Anderson, Fair Haven; Orni Petruschka, Middletown, both of N.J.

[73] Assignee: Bell Communications Research Inc., Livingston, N.J.

[21] Appl. No.: 300,116

[22] Filed: Jan. 19, 1989

[51] Int. Cl.$^5$ ............................................ H04B 14/06
[52] U.S. Cl. ...................................... 375/27; 375/106
[58] Field of Search ...................... 375/27, 30, 25, 122, 375/106; 358/133, 135, 261; 382/56; 370/58, 62, 100.1

[56] References Cited

U.S. PATENT DOCUMENTS

| 4,271,502 | 6/1981 | Goutmann et al. | 370/62 |
| 4,691,233 | 9/1987 | Acampora | 375/27 |
| 4,722,003 | 1/1988 | Kondo | 358/135 |
| 4,747,096 | 5/1988 | Piasecki et al. | 370/110.1 |
| 4,813,056 | 3/1989 | Fedele | 375/27 |
| 4,860,313 | 8/1989 | Shpiro | 375/122 |

OTHER PUBLICATIONS

"7 kHz Audio Coding Within 64 kbit/s", *CCITT Recommendation G. 722, IXth Plenary Assembly Melbourne* 1988, Study Group XVIII-Report R27, Document AP IX-142-E, Jul. 1988, pp. 231-318 (the CCITT G.722 Recommendation).
"Frame Structure for a 64 kbit/s Channel in Audiovisual Applications Teleservices," *CCITT Recommendation H.221, IXth Plenary Assembly Melbourne* 1988, Study Group XV, Report R 33, Document AP IX-59-E, Apr. 1988, pp. 104-121 (the CCITT H. 221 Recommendation).
B. M. du Biest et al, "Broadcast Networking via Single PSTN B Channels", *Telecommunications*, Aug. 1988, pp. 57-59 and 67.
"A Plan for 7-kHz Audio and Audio/Data Transmission at 64 kb/s", *Bell Communications Research Special Report SR-TSY-000841*, Issue 1, Feb. 1988 (the Bellcore publication).

Primary Examiner—Benedict V. Safourek
Assistant Examiner—Stephen Chin
Attorney, Agent, or Firm—James W. Falk

[57] ABSTRACT

Apparatus and methods are disclosed for recovering alignment from a non-ideally encoded multi-bit digital signal without the need to embed framing information within the encoded signal or append framing bits thereto. In particular, the invention is disclosed in the context of recovering septet alignment in a sub-band ADPCM (adaptive differential pulse code modulated) 7 kHz audio digital signal without the need to embed any framing information within the digital signal itself. Specifically, in this context, this method relies on first gathering statistics from a 56 kbit/second 7 kHz audio digital signal itself for a pre-defined number of incoming bits that occur during a measurement interval and for every one of seven possible alignments for a septet. Once these statistics are gathered, the alignment is selected to be that which satisfies various pre-defined statistical tests that are dictated by non-uniform deterministic characteristics that occur in the ADPCM audio digital signal itself, once it is properly aligned, and specifically certain characteristics which exist in a distribution of the occurrences of the different combinations of the four most significant bits of the low-band ADPCM codewords situated within properly aligned ADPCM septets that occurred during the measurement interval.

26 Claims, 8 Drawing Sheets

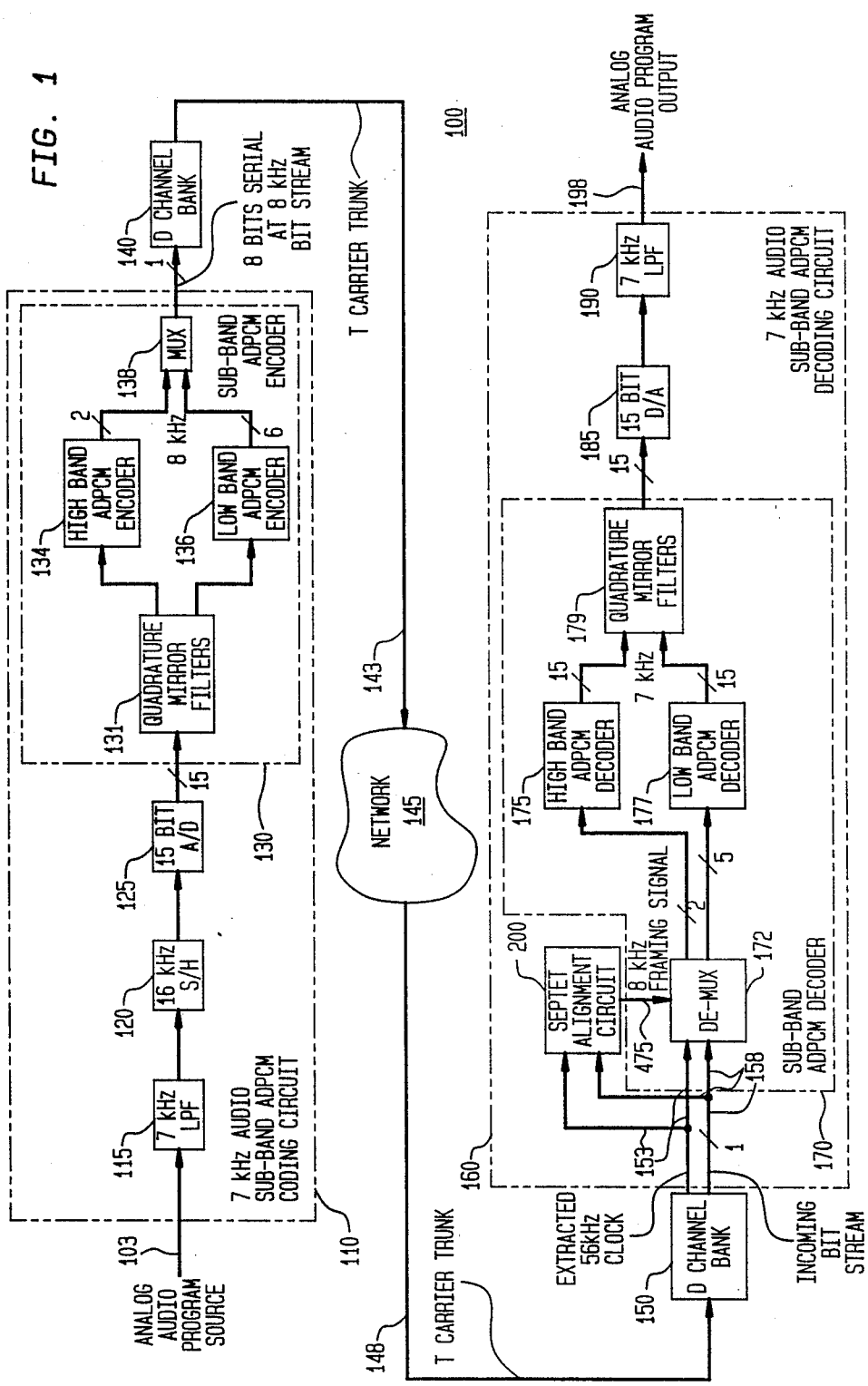

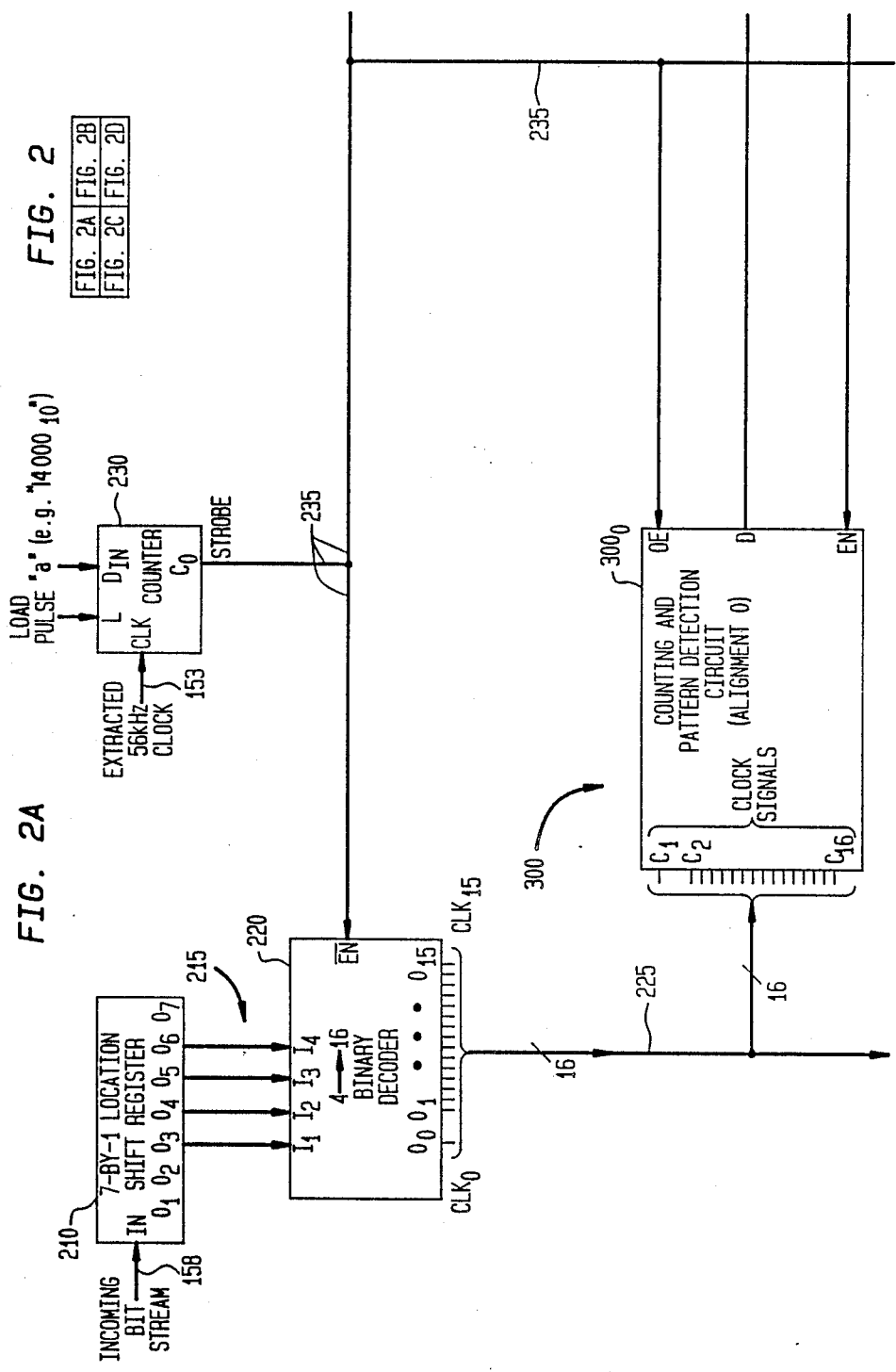

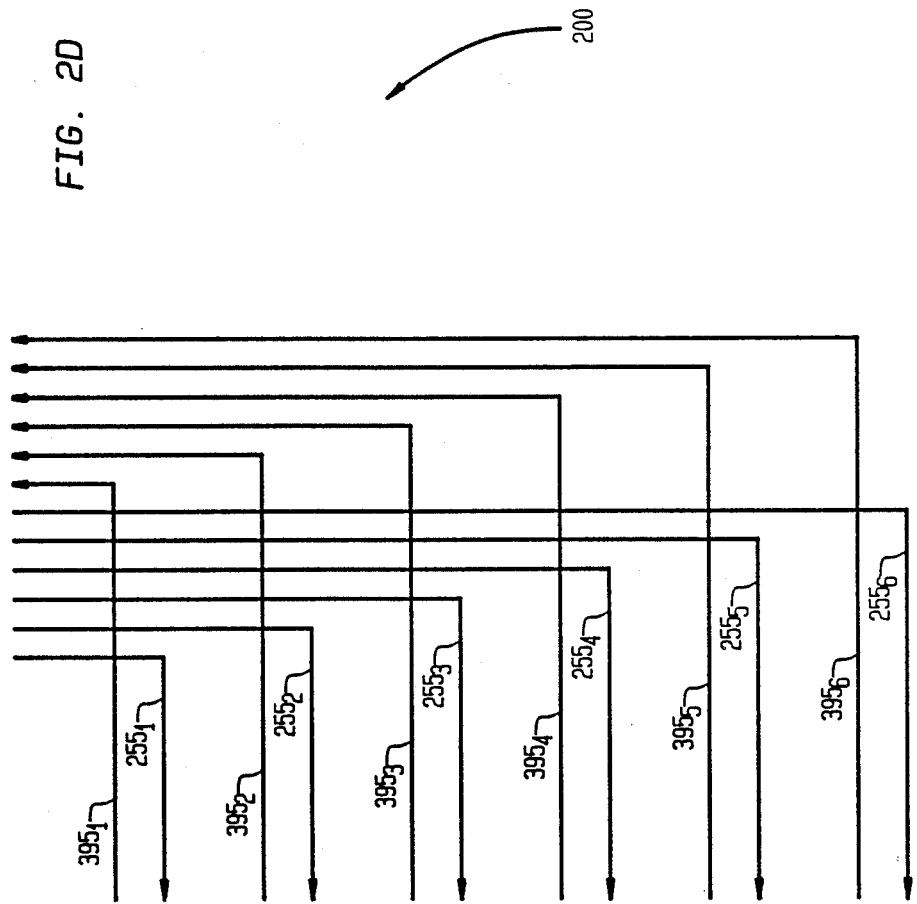

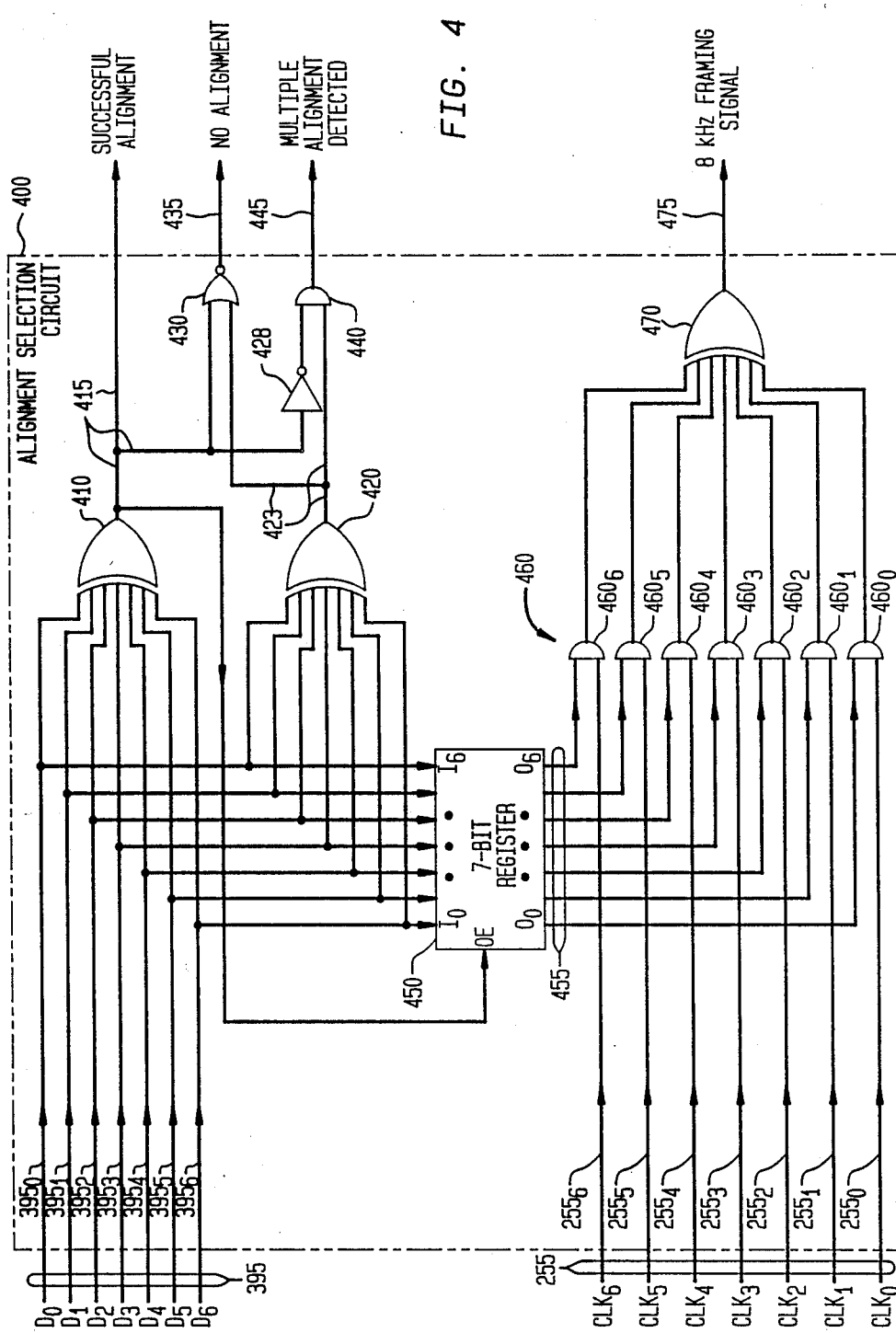

APPARATUS AND METHODS FOR RECOVERING ALIGNMENT FROM A NON-IDEALLY ENCODED MULTI-BIT DIGITAL SIGNAL

BACKGROUND OF THE INVENTION

1. Field of the Invention

The invention relates to apparatus and methods for recovering alignment from a non-ideally encoded multi-bit digital signal without the need to embed framing information within the encoded signal or append framing bits thereto and particularly to recovering septet alignment in a 7 kHz audio digital signal without the need to embed any framing information within the audio digital signal itself.

2. Description of the Prior Art

Presently, voice communication over a single analog telephone loop is generally limited to a bandwidth of approximately 3.1 kHz. Inasmuch as a significant amount of the energy that occurs in human speech occurs at frequencies in excess of 3.1 kHz, 3.1 kHz bandlimited speech often sounds distorted and quite unnatural. For some time, the art has widely recognized that speech which has been bandlimited to 7 kHz is highly intelligible and appears rather natural with a noticeable improvement in quality over 3.1 kHz bandlimited speech.

As such, in certain audio communication applications where speech clarity and reduced distortion are necessary, such as illustratively in teleconferencing and providing commentary quality audio channels to interconnect remote program sources to broadcast stations, telephone channels that provide a 7.5 kHz audio bandwidth are often utilized.

Initially, one would think that 7.5 kHz channels could be easily provided through a dedicated point to point wideband analog link supplied by a local telephone company. Unfortunately, dedicated wideband analog links suffer several serious drawbacks which tend to greatly limit their utility and availability. First, these links are susceptible to noise, particularly hum resulting from power line induction. Second, since the need for such links tends to be geographically widespread and transitory in nature, each link is generally separately installed prior to the initiation of its specific use and then torn down after this use is concluded. Third, these links, primarily being copper wire in nature, are not perfect transmission media. In fact, the transmission characteristics of such a link vary with changes in the length of the link and are dependent upon the frequencies being propagated therethrough. In essence, these characteristics attenuate the peak amplitude of and impart phase distortion to the analog signal applied to the link. To assure that a wideband analog link provides a virtually flat response thereby assuring, to the extent possible, that the signal received at a far end of such a link closely replicates a source signal that is applied to a near end of the link, ancillary electronic analog circuitry needs to be inserted, typically at a far end of the link, to compensate for the actual attenuation and impedance of the link being used, i.e. so as to "align" the line. Unfortunately, this ancillary circuitry tends to be rather complex and requires a highly skilled craftsperson to first properly adjust the circuitry such that its characteristics are typically the inverse of those of a given link and subsequently operate the circuitry to maintain the link in an aligned condition in response to any changes in the frequency content of the signal carried thereover. Moreover, a telephone company, even one in a large metropolitan area, often has only a very small number of such craftspersons. Hence, due to the susceptibility of wideband analog links to noise, the need to expend resources to separately install and tear down each link, and the need to utilize highly skilled personnel to align and maintain each link during its use, wideband analog links tend to be widely disfavored by the local telephone companies for use in many applications and for that reason are seldom used.

Given the drawbacks associated with wideband analog links, the art has instead increasingly turned to converting a high quality audio signal into digital form and carrying the digitized signal over a digital channel to provide a so-called digital program channel. Several reasons account for increasing use of a digital signal. First, digital links are immune to noise, such as power line induction and are widely available as part of existing T carrier systems. In addition, digital data is unaffected by any change in the impedance of a physical link that carries a digital signal. As such, given the advantages afforded by digital transmission, digital program channels are widely used today to carry high quality audio signals.

A digital program channel has been and, to a certain extent, is still widely implemented in the following basic manner. A high quality analog audio signal is routed, via a four wire link, to a digital channel bank, typically located in a central office, where the analog audio signal is first bandlimited to 7.5 kHz. The resulting bandlimited signal is then sampled at 16 kHz with each sample then being digitized into 14 bit form through an analog-to-digital (A/D) converter. Each resulting 14 bit digital word is then converted through instantaneous A-law companding into an 11 bit pulse code modulated (PCM) word. A single parity bit is then added to each resulting word to form a twelve bit data word for each sample. Given a 16 kHz sampling rate, the resulting transmission speed becomes 192 kbit/second. Unfortunately, transmitting a signal at this bit rate requires the use of three adjacent 64 kbit/second digital channels that appear on a digital (D) channel bank. Moreover, since an analog loop, preferably unloaded, is still required between a customer premise and the central office, noise, such as hum, can be and is often disadvantageously induced into the analog signal prior to its conversion into digital form thereby injecting noise into the digital signal. In addition, since an analog loop along with various attendant services, such as equalization, that assure its proper operation, is required, the installation of a 192 kbit/second 7.5 kHz digital program channel is still rather costly.

In an effort to decrease the number of 64 kHz digital channels from three to one that is needed to transmit a high quality digitized audio signal and also eliminate the need for any analog loops by locating the digital encoder at a customer premise rather than at a central office, the art has turned to transmitting digital audio signals using adaptive differential pulse code modulation (ADPCM) techniques. Inasmuch as the ADPCM circuitry, which is owned by the customer, is located in the customer premise and directly (i.e. DC) coupled to the incoming audio signal, analog loops are eliminated with the resultant ADPCM digital signal being substantially noise free with an essentially flat frequency response. Using such a signal advantageously simplifies the responsibility of a local telephone company to merely provide an end-to-end 64 kbit/second digital channel.

With ADPCM techniques, a high quality audio signal is applied through a suitable low pass filter to bandlimit the signal to 7 kHz. The resulting bandlimited signal is then sampled at 16 kHz, with each sample being converted into 15 bit form. Using adaptive differential techniques, an encoder reduces each sample to 8 bits at a reduced sample rate of 8 kHz. In particular, given a present sample, the encoder predicts the value of a successive sample, through use of a set of parameters obtained from processing previous samples, then subtracts the predicted sample value from the actual sample value to produce a difference value and finally transmits the difference value. Adaptation occurs inasmuch as a scale that is used to encode the difference value adaptively varies according the magnitude of prior difference values. Inasmuch as most of the available energy contained in a speech signal lies within a 0–4 kHz frequency sub-band with the remainder residing in a 4 kHz –8 kHz sub-band, an ADPCM encoded 4-bit signal disadvantageously possesses differing ratiometric values of signal to distortion for each of the two sub-bands. As such, the art has turned to encoding a 7 kHz audio signal using sub-band ADPCM, as described in detail in "7kHz Audio Coding Within 64 kbit/s", CCITT Recommendation G.722, IXth Plenary Assembly Melbourne 1988, Study Group XVIII—Report R 27, Document AP IX-142-E, July 1988, pages 231—318; (henceforth referred to as the CCITT G.722 Recommendation). In essence, sub-band ADPCM first relies on sampling an incoming 7 kHz audio signal at 16 kHz with a 15 bit resolution. Then, through the use of two linear-phase non-recursive digital filters (i.e. a quadrature mirror filter), the sampled digital signal is split into two bands: a lower 0–4kHz sub-band and an upper 4 kHz–8 kHz sub-band. Thereafter, the lower sub-band is encoded into a 6-bit 8 kHz ADPCM signal while the upper sub-band is encoded into a 2-bit 8 kHz ADPCM signal. The resulting eight bits are then multiplexed together to form an 8-bit 8 kHz ADPCM signal for transmission over a single 64-kHz digital channel. Each 8-bit word is commonly referred to as an octet. Sub-band ADPCM advantageously provides a coded signal that, through the use of differing amounts of bits for each sub-band, evenly spreads signal distortion across the entire 0–8 kHz band.

As such, sub-band ADPCM now appears to be a favored coding technique for transmitting 7 kHz audio signals on a single 64 kbit/second digital channel.

Unfortunately, in North America, most digital channels that are currently available for user access have been designed to carry data and not voice at a maximum user capacity of 56 kbit/second. In particular, while these digital channels do in fact carry 64 kbits/second, only seven bits in each octet are available to carry user supplied data at a rate of 56 kbit/second with the eighth bit, which is always fixed to a one, being reserved for telephone company use in extracting timing information from the bit stream appearing on the channel. For that reason, these channels will be henceforth referred to as 56 kbit/second channels. As such, these channels do not possess the requisite capacity to carry the octets that form the 7 kHz ADPCM encoded audio digital signal. However, the sub-band ADPCM coding technique, as set forth in the CCITT G.722 Recommendation, advantageously possesses the flexibility to permit a user not to transmit the least significant bit of every octet with only minimal degradation occurring in the quality of the audio signal that has been reconstructed at a far end location. As such, every sub-band ADPCM encoded octet can become a 7-bit word (i.e. a septet), which, in turn, reduces the bit rate of the coded words themselves to essentially match that of an available 56 kbit/second channel. Unfortunately, a 56 kbit/second channel is not able to carry a clocking (framing) bit in addition to each septet. This deficiency is irrelevant for data inasmuch as a 56 kbit/second channel was designed to merely provide a bit based transport media which is all that is required to carry data. As such, the user of such a channel rather than its provider, i.e. the local telephone companies, has the responsibility to provide necessary framing by embedding suitable protocols within a data stream carried on the channel using terminal equipment connected to both ends of the channel. However, whenever these channels are to be used to carry audio information, the equipment connected to these channels requires that some form of framing be provided in order for that equipment to properly group the bits of each septet.

One technique proposed in the art for providing septet alignment involves multiplexing framing information onto each septet. See, specifically, that disclosed in "Frame Structure for a 64 kbit/s Channel in Audiovisual Applications Teleservices," CCITT Recommendation H.221, IXth Plenary Assembly Melbourne 1988, Study Group XV, Report R 33, Document AP IX-59-E, April 1988, pages 104–121 (hereinafter referred to as the CCITT H.221 Recommendation). Here, this technique injects framing information into one bit of each septet, typically bit seven. As a result of this approach, this technique has several drawbacks. First, this technique reduces the available audio bit rate to 48 kbit/second. Second, both the receiving and transmitting terminal equipment that are situated on opposite ends of a 56 kbit/second digital channel must use the same framing technique. Third, unrecoverable framing errors could occur if the terminal equipment situated at both ends of the channel are configured to exploit the full 56 kbit/second bit rate of the channel to transmit audio information. Specifically, with this technique the terminal equipment situated at both ends of the channel may be configured to drop framing, i.e. cease transmitting framing information, after septet alignment has been obtained. Unfortunately, if a failure (e.g. a slip on the channel) occurs and framing is lost, then the receiving terminal equipment is required to detect that loss, and subsequently transmit a control signal back to the transmitting terminal equipment to re-instate the framing signal and re-start an alignment procedure. This can occur only if the channel provides two way communication and special purpose communication circuitry exists within the terminal equipment situated at both ends of the channel to provide special signalling procedures therebetween. In the absence of satisfying either of these requirements, framing errors would likely be unrecoverable. In view of these drawbacks, the technique presented in the CCITT H.221 Recommendation simply does not provide a satisfactory solution for providing septet alignment for a 7 kHz digital audio signal transmitted over a 56 kbit/second digital channel.

Therefore, a need exists in the art for a method and accompanying apparatus for providing septet alignment for a 7 kHz sub-band encoded ADPCM digital audio signal without embedding framing bits within this signal. This alignment method should be sufficiently robust to enable framing to be quickly re-established after a loss of alignment occurs. Moreover, this method should not require the use of special signalling procedures, thereby eliminating the need to incorporate special purpose communication circuitry in both the receiving and transmitting terminal equipment that are connected to opposite ends of a 56 kbit/second digital channel.

SUMMARY OF THE INVENTION

These and other deficiencies in the art associated with providing septet alignment in a encoded ADPCM 7 kHz digital audio signal are advantageously solved by our inventive method of recovering septet alignment through the steps of: gathering statistics from the ADPCM encoded signal itself for a pre-defined number of incoming bits in the signal and for every one of seven possible alignments for a septet, and then choosing that alignment which satisfies various pre-defined statistical tests that are dictated by non-uniform deterministic characteristics that occur in the encoded audio digital signal itself when it is properly aligned.

As a result of the imperfect coding provided by sub-band ADPCM, we have discovered that over a given interval of time a deterministic pattern exists within the distribution of the number of occurrences of the different combinations of the four most significant bits that form the low-band ADPCM codewords situated within properly aligned ADPCM septets. In particular, within the distribution for the proper alignment, the four bit combination "0000" should not occur, and the distribution sharply decreases between the combinations "0111" and "1000" and generally increases on monotonic basis elsewhere.

As such and in accordance with a preferred embodiment of the invention, our method specifically involves first counting the occurrences of each possible combination of the four most significant bits in the low-band ADPCM codewords of incoming ADPCM septets that occur during a given measurement interval, e.g. 0.25 seconds, that produces a desired number of incoming bits, e.g. 14000 bits. Separate counts are maintained for each different combination that occurs in each of seven different possible alignments of the septets. Each combination has a unique decimal value associated therewith. For example, the combinations "0000", "0001", . . . , "1111" have the corresponding decimal values 0, 1, . . . , and 15. At the conclusion of the measurement interval, the distribution of occurrence data for each different alignment is then tested to determine whether that distribution is approximately zero for the combination zero, sharply decreases between the combinations 7 and 8, and monotonically increases between the combinations 3 and 4 and between the combinations 11 and 12. The alignment of the signal is then selected to be that alignment which possesses a corresponding distribution that satisfies all these tests. Based upon this selection, a properly phased 8 kHz clock signal which is delayed by a requisite number of 56 kHz increments is then provided as a framing signal for use in aligning subsequent incoming septets. Appropriate signals are also provided to indicate error conditions if either a single alignment is not recovered or multiple alignments are recovered.

BRIEF DESCRIPTION OF THE DRAWINGS

The teachings of the present invention may be readily understood by considering the following detailed description in conjunction with the accompanying drawings, in which:

FIG. 1 depicts a block diagram of 7 kHz audio sub-band adaptive differential pulse code modulation (ADPCM) transmission and reception system 100 that relies on recovering septet alignment information from an encoded 7 kHz sub-band ADPCM signal in accordance with the teachings of the present invention;

FIG. 2 shows the proper alignment of the drawing sheets for FIGS. 2A–2D;

FIGS. 2A–2D collectively depict a block diagram of inventive septet alignment circuit 200 that forms part of system 100 shown in FIG. 1;

FIG. 4 depicts a block diagram of alignment selection circuit 400 that forms part of inventive septet alignment circuit 200 shown in FIGS. 2A–2D.

To facilitate understanding, identical reference numerals have been used, where possible, to denote identical elements that are common to various figures.

DETAILED DESCRIPTION

Figure 2B:
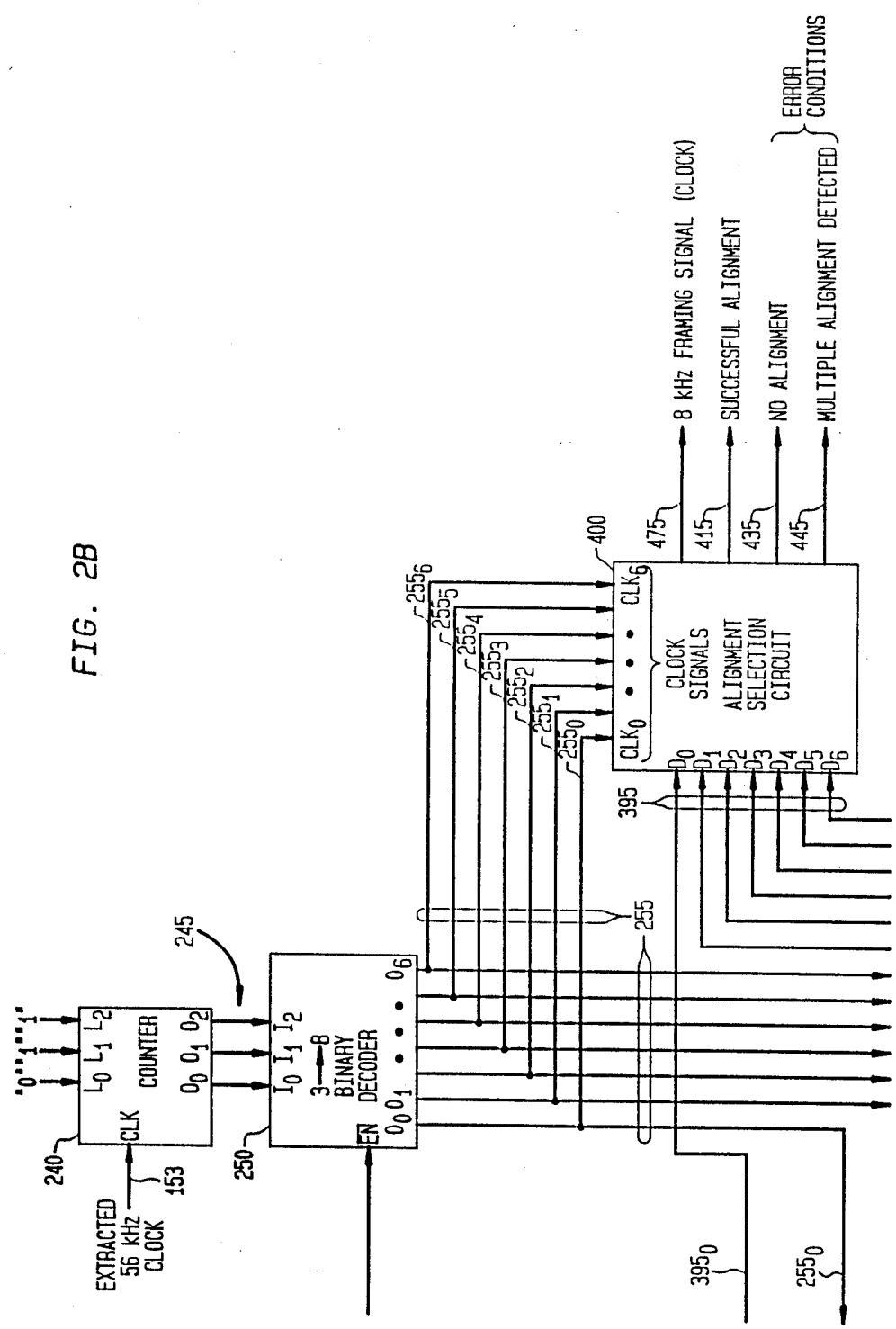

After reading the following detailed description, those skilled in the art will clearly realize that the teachings of the present invention can be applied to recovering alignment from substantially any transmitted multi-bit encoded digital signal where the encoded signal is non-ideal, i.e. wherein the encoded signal contains a deterministic pattern. Nonetheless, for purposes of illustration, the invention will be discussed in the context of recovering septet alignment from an encoded 7 kHz sub-band adaptive differential pulse code modulation (ADPCM) digital audio signal that is transmitted on a 56 kbit/second digital channel.

A block diagram of 7 kHz audio sub-band ADPCM transmission and reception system 100, that relies on recovering septet alignment information from an encoded 7 kHz sub-band ADPCM signal in accordance with the teachings of the present invention, is depicted in FIG. 1.

Specifically, within system 100, an incoming analog audio program source is routed, via lead 103, to transmitting terminal equipment 110, situated at a near end location, which encodes the audio program into a 7 kHz sub-band ADPCM digital signal. The resulting sub-band ADPCM encoded digital signal consists of successive octets (serial eight bit groups) that occur at a rate of 8 kHz. This digital signal is then applied, within a central office that serves the near end location (i.e. the near end central office), to Digital (D) Channel bank 140 which first drops the least significant bit from each octet to form a corresponding septet (seven bit group) and then transmits the bits that form each septet as a serial bit stream over a 56 kbit/second digital channel (i.e. an assigned time slot) that is available over a high speed digital link, such as T Carrier trunk 143. Alternatively, in another implementation, the transmitting terminal equipment can drop the least significant bit that occurs in each octet and then stuff a pre-determined bit in place of the dropped bit in that octet in order to form a 64 kbit/second signal that contains 56 kbit/second ADPCM encoded audio. Trunk 143 connects the near end central office to network 145. Trunk 148, also a suitable T Carrier trunk, connects network 145 to a central office that serves a desired far end location (i.e. the far end central office). Network 145 provides a transmission path between these two trunks. This transmission path may be either switched or dedicated. At the far end central office, D Channel bank 150 extracts an incoming bit stream that represents the 56 kbit/second ADPCM encoded digital signal from the assigned time slot that appears over trunk 148. The D Channel bank also extracts a 56 kHz clock signal. The extracted 56 kHz clock signal and the incoming bit stream are respectively applied over leads 153 and 158 to receiving terminal equipment 160 that is situated at the far end location. This terminal equipment decodes the sub-band encoded ADPCM signal into an analog audio signal and then routes the resultant analog signal to lead 198 as a 7 kHz analog audio program output signal. This audio signal is, in turn, subsequently fed to appropriate downstream equipment for further use, e.g broadcast, recording, playback or/and the like.

The discussion will now proceed to convey an overall understanding of the sub-band ADPCM technique utilized by the terminal equipment situated at both ends of the channel and the necessity to use the inventive alignment recovery technique in conjunction therewith. Inasmuch as the specific manner through which transmitting and receiving terminal equipment 110 and 160 provide 7 kHz sub-band ADPCM encoding and decoding is well-known in the art, then, for purposes of brevity, the associated elements of this terminal equipment will only be discussed at a high level.

In particular, within transmitting terminal equipment 110, an incoming analog audio program source (audio signal) applied over lead 103 is routed to 7 kHz low pass filter 115 to bandlimit the signal accordingly. The resultant bandlimited signal is applied to sample and hold (S/H) circuit 120 which samples this signal at a 16 kHz clock rate. Each resulting sample is fed to analog-to-digital (A/D) converter 125 which digitizes the sample into a corresponding 15-bit digital value. This value is then applied to sub-band ADPCM encoder 130 and specifically to quadrature mirror filters 131. These filters, typically a pair of linear-phase non-recursive digital filters, split each sample in the digitized signal into two values, one for a lower 0-4 kHz sub-band and another value for an upper 4 kHz -8 kHz sub-band. These values are respectively routed to high band ADPCM encoder 134 and low band ADPCM encoder 136 which correspondingly produce 6-bit 8 kHz ADPCM codewords for the low band and 2-bit 8 kHz ADPCM codewords for the high band. The resulting 8 bits are then multiplexed together by multiplexer 138 to form an 8-bit 8 kHz ADPCM signal which, in turn, is routed to D Channel bank 140.

Within receiving terminal equipment 160, the 56 kbit/second ADPCM bit stream appearing on lead 158 is routed to de-multiplexer 172 situated within sub-band ADPCM decoder 170. This decoder also contains high band and low band ADPCM decoders 175 and 177 and quadrature mirror filters 179. In particular, de-multiplexer 172 separates the bit stream into two bit ADPCM codewords for the upper 4 kHz-8 kHz sub-band and five bit ADPCM codewords for the lower 0-4 kHz sub-band which are, in turn, respectively applied to high band ADPCM decoder 175 and low band ADPCM decoder 177. Each of these decoders produces a 15-bit digital signal. The resulting decoded digital signals are applied to quadrature mirror filters 179, also typically a pair of linear-phase non-recursive digital filters, which re-construct a stream of 15-bit digital samples therefrom. Specifically, these filters interpolate the decoded digital signals and produce a stream of 15-bit digital samples at a 16 kHz frequency. These samples are then routed to 15-bit digital-to-analog (D/A) converter 185 which converts the samples into an analog signal. The resulting analog signal is then routed through 7 kHz low pass filter 190 to remove any noise therefrom. The resulting filtered analog audio signal is routed to lead 198 as the 7 -kHz analog audio program output signal. The operation of the transmitting and receiving terminal equipment 110 and 160, as thusfar discussed, is consistent with that which is well known in the art. See, e.g., "7kHz Audio Coding Within 64 kbit/s", CCITT Recommendation G.722, IXth Plenary Assembly Melbourne 1988, Study Group XVIII - Report R 27, Document AP IX-142-E, July 1988, pages 231-318; (henceforth referred to as the CCITT G.722 Recommendation).

Now, whenever a 56 kbit/second digital channel, such as that provided by D Channel banks 140 and 150, is used to carry audio information, the equipment connected to the channel requires that some form of framing be provided in order for that equipment to properly group the bits of each septet in the correct order. Unfortunately, due to limitations of the 56 kbit/second digital channel, no space exists within the channel to carry framing information along with all the individual septets in their entirety that form the 7 kHz audio digital signal.

As such and in accordance with the teachings of our present invention, we have developed a technique for extracting framing information from the received septets themselves. In particular, this technique, embodied in septet alignment circuit 200, relies on first gathering statistics in the 56 kbit/second 7 kHz audio digital signal itself over a pre-defined number of incoming bits and for every one of seven possible alignments for a septet. Once this has occurred, the alignment is then chosen as that which satisfies various pre-defined statistical tests that are dictated by non-uniform deterministic characteristics that occur in the encoded audio digital signal itself when it is properly aligned.

In particular, ADPCM signals are non-ideally encoded, i.e. each of the different ADPCM codewords does not occur with equal probability. Specifically, North American digital facilities do not allow the transmission of an all-zero octet. To achieve this, low-band ADPCM encoder 136 uses a 15—level quantizer for the four most significant bits in lieu of a 16—level quantizer. As such, the four bit combination "0000" is not used. Consequently, a legal low-band encoded ADPCM sample can not contain four zeroes in its most significant four bit positions. Given this encoding constraint, a septet of the form "xx0000x" (where "x" represents either a one or zero) is not allowed to occur.

In addition to this deterministic property, we have discovered that other statistically deterministic properties exist within an 7 kHz sub-band ADPCM encoded signal, specifically that utilized by the G.722 Recommendation. In this regard, we have observed that, over time, a distinct pattern will emerge in the distribution of the different permissible values that occur in the four most significant bits of the low-band ADPCM codewords, once they are properly aligned.

To illustrate the pattern, we have measured the percentage of occurrence for each of the 16 different combinations (values) of the four most significant bits of properly aligned low-band ADPCM codewords that occurred during each of three illustrative measurement intervals: 475 milliseconds (msec) of silence (i.e. no speech), 475 msec of typical human speech and 1.98 seconds containing both silence and typical human speech— in the third interval, the speech lasted approximately 1 second. The measured percentages of occurrence for each of these intervals are given in the following three tables.

TABLE 1

Measured percentages of occurrence for a 475 msec interval of silence

| Value | Most Significant Four Bits (Combination) | Percentage of Occurrence |
|---|---|---|
| 0 | 0000 | 0.00000 |
| 1 | 0001 | 0.00000 |
| 2 | 0010 | 0.16000 |
| 3 | 0011 | 0.05333 |
| 4 | 0100 | 0.50667 |
| 5 | 0101 | 1.92000 |
| 6 | 0110 | 8.58667 |
| 7 | 0111 | 16.10667 |
| 8 | 1000 | 0.16000 |
| 9 | 1001 | 0.13333 |
| 10 | 1010 | 0.24000 |
| 11 | 1011 | 1.49333 |
| 12 | 1100 | 7.76000 |
| 13 | 1101 | 20.53333 |
| 14 | 1110 | 27.54667 |
| 15 | 1111 | 14.80000 |

TABLE 2

Measured percentages of occurrence for a 475 msec interval of typical speech

| Value | Most Significant Four Bits (Combination) | Percentage of Occurrence |
|---|---|---|
| 0 | 0000 | 0.00000 |
| 1 | 0001 | 0.00000 |
| 2 | 0010 | 0.02667 |
| 3 | 0011 | 0.80000 |
| 4 | 0100 | 5.62667 |
| 5 | 0101 | 10.26667 |
| 6 | 0110 | 14.64000 |
| 7 | 0111 | 15.54667 |
| 8 | 1000 | 0.34667 |
| 9 | 1001 | 0.61333 |
| 10 | 1010 | 1.20000 |
| 11 | 1011 | 3.97333 |
| 12 | 1100 | 7.76000 |
| 13 | 1101 | 10.85333 |
| 14 | 1110 | 13.76000 |
| 15 | 1111 | 14.58667 |

TABLE 3

Measured percentages of occurrence for a 1.98 sec interval containing silence and approximately 1 second of typical speech

| Value | Most Significant Four Bits (Combination) | Percentage of Occurrence |
|---|---|---|
| 0 | 0000 | 0.00000 |
| 1 | 0001 | 0.01266 |
| 2 | 0010 | 0.05696 |
| 3 | 0011 | 0.25316 |
| 4 | 0100 | 2.00000 |
| 5 | 0101 | 4.95570 |
| 6 | 0110 | 10.38608 |
| 7 | 0111 | 15.93038 |
| 8 | 1000 | 0.15190 |
| 9 | 1001 | 0.24051 |
| 10 | 1010 | 0.58228 |
| 11 | 1011 | 2.25316 |
| 12 | 1100 | 8.09494 |
| 13 | 1101 | 18.07595 |

TABLE 3-continued

Measured percentages of occurrence for a 1.98 sec interval containing silence and approximately 1 second of typical speech

| Value | Most Significant Four Bits (Combination) | Percentage of Occurrence |
|---|---|---|
| 14 | 1110 | 22.19620 |
| 15 | 1111 | 14.81013 |

Each combination has a unique decimal value associated therewith. For example, the combinations "0000", "0001", ..., "1111" have the corresponding decimal values 0, 1, ..., and 15 associated therewith. For purposes of simplicity, each combination will henceforth be referred to using its decimal value, e.g. combination 1 for "0001", combination 2 for "0010" and so on. As such, from these tables, a characteristic pattern exists in each of these three distributions. First, the percentage for the all-zero combination is zero in all cases, as expected. Second, the percentage of occurrence is generally monotonically increasing, except for a relatively large decrease that occurs between the combinations 7 and 8.

With this in mind, the inventive technique extracts septet alignment by: (a) counting the occurrences of each possible combination of the four most significant bits in the low-band ADPCM codewords of an incoming ADPCM septets over a given measurement interval for each of seven different alignments of the septets, and then (b) choosing that alignment for these septets that has corresponding measured occurrence data with a distribution which is approximately zero for the combination zero, sharply decreases between the combinations 7 and 8, and monotonically increases elsewhere, e.g. illustratively between the combinations 3 and 4 and between the combinations 11 and 12. Anytime alignment is lost, such as from a slip on the channel, alignment can be quickly re-gained by merely counting occurrence data during a successive measurement interval and choosing an appropriate alignment based upon the newly measured data. Moreover, septet alignment can be continually monitored by counting occurrence data during successively occurring measurement intervals, regardless of whether these intervals are contiguous or merely occur at a given repetition rate. Through such continual measurements, septet alignment can be dynamically changed, if necessary, to guard against a loss of alignment.

We have advantageously found this technique to be relatively simple and inexpensive to implement, sufficiently robust to enable alignment to be quickly re-established whenever a loss of alignment occurs, and not require any special signalling procedures to occur between the receiving and transmitting terminal equipment whenever such a loss occurs. In addition, this technique advantageously eliminates the need to embed any framing bits within the encoded ADPCM signal itself or append any framing bits thereto. As such, use of this technique in the terminal equipment connected to one end of a 56 kbit/second channel does not affect the operation of any other terminal equipment connected to that channel.

With the above in mind, inventive septet alignment circuit 200, which is discussed in detail below in conjunction with FIGS. 2A–2D, extracts a properly phased 8 kHz clock signal from the septets themselves that collectively form the 7 kHz sub-band ADPCM encoded audio digital signal. This clock signal is applied, over leads 475, as a control signal to de-multiplexer 172 (see FIG. 1) to route a group of seven incoming bits in parallel through the de-multiplexer at the appropriate time, thereby identifying the proper alignment of the bits that form each septet. In particular, the incoming 56 kbit/second bit stream and the accompanying 56 kHz clock signal that have both been extracted by D Channel bank 150 from T Carrier trunk 148 are routed by leads 158 and 153, respectively, to septet alignment circuit 200. This circuit determines the septet alignment of the 7 kHz ADPCM encoded signal and provides, synchronous with a pulse of the 56 kHz clock signal appearing over leads 153, a properly phased 8 kHz clock pulse over lead 475 as the control signal to de-multiplexer 172.

Figure 2C:
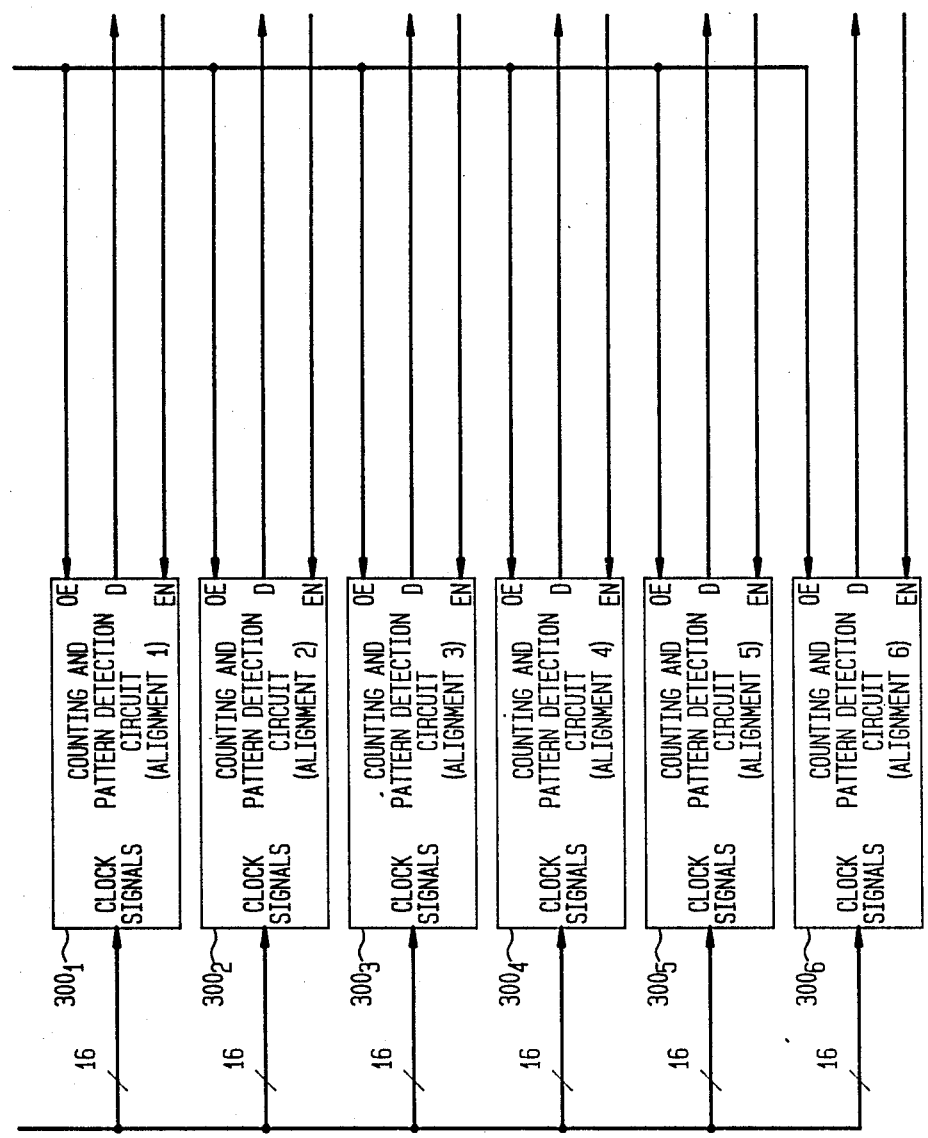

A block diagram of inventive septet alignment circuit 200 that forms part of system 100 shown in FIG. 1 is collectively depicted in FIGS. 2A–2D; the proper alignment of the drawing sheets for these figures is shown in FIG. 2.

As shown, circuit 200 contains counting and pattern detection circuits 300 which is formed of seven identical individual counting and pattern detection circuits $300_0$, $300_1$, ..., $300_6$. Each of these seven counting and pattern detection circuits counts the occurrences of each combination of the four most significant bits of each low-band ADPCM codeword for a given alignment and determines whether the distribution of the occurrences for that alignment satisfies pre-defined statistical tests; namely, whether that distribution is approximately zero for the combination zero, sharply decreases between the combinations 7 and 8, and monotonically increases elsewhere, e.g. illustratively between the combinations 3 and 4 and between the combinations 11 and 12. Each of the seven circuits produces a corresponding control signal at its "D" output which assumes either a high state if the tests were met for that alignment or a low state otherwise. These control signals are routed over leads 395, specifically leads $395_0$, $395_1$, ..., $395_6$ for circuits $300_0$, $300_1$, ..., $300_6$, respectively, along with phased 8 kHz clock signals appearing over leads 255 to alignment selection circuit 400. In the event septet alignment was successfully recovered by one of the counting and decision circuits, alignment selection circuit 400 produces a corresponding pulse on lead 415 to indicate alignment was successfully recovered and a properly phased 8 kHz clock signal on lead 475 for use as a framing signal. To indicate appropriate error conditions, circuit 400 also produces a pulse on lead 435 if alignment was not found or a pulse on lead 445 if multiple alignments were found, i.e. two or more alignments had distributions that satisfied the statistical tests. If either of these error conditions occurs, then appropriate action, such as re-starting the measurement interval or discontinuing the counting over an longer interval of time in order to obtain a larger measurement sample than that which had just occurred, could be taken by downstream control equipment (not shown) in an attempt to successfully recover alignment. Alternatively, the pulses appearing on leads 415, 435 and 445 can be suitably used to initiate these actions.

To provide occurrence data for counting, the incoming 56 kbit/second serial bit stream appearing on lead 158 is applied to a shift input ("IN") of 7-bit shift register 210. The contents of the four most significant bits of the five low-band ADPCM codewords, appearing at outputs $0_3$, $0_4$, $0_5$ and $0_6$ of the shift register, are routed, via leads 215, to 4-to-16 binary decoder 220. Based upon the value of these four bits, binary decoder 220 generates a high level on one of sixteen separate parallel output leads 225. Each of these leads feeds respective clock inputs, $C_1$, $C_2$, ..., or $C_{16}$, of each of the seven counting and pattern detection circuits 300. As such, each combination of these four bits provides a pulse on a respective one of the sixteen clock leads that feeds each of counting and pattern detection circuits. Each of the separate counting and pattern detection circuits contains 16 separate counters, each of which counts the occurrences of a corresponding one of sixteen combinations of these four bits.

To count the occurrences for each different alignment, separately phased 8 kHz enable signals are generated over leads 255 by counter 240 and 3-to-8 binary decoder 250 and applied to circuits 300. These signals contain seven different phases, each of which is routed to a successive corresponding one of circuits 300 to enable it to count the currently occurring four bit value. As such, only one of these circuits is enabled at any one time to count the occurrence of a combination. To generate these enable signals, counter 240 is loaded with the decimal value "6" (110) and then decremented by one with each extracted 56 kHz clock pulse occurring on lead 153. Whenever the contents of the counter reach zero, the counter then rolls over to the value "6" and resumes decrementation. The counter produces a three-bit output on leads 245 that is routed to 3-to-8 binary decoder 250 which, in turn, produces an 8 kHz clock pulse on a corresponding one of the seven enable leads $255_0$, $255_1$, ..., $255_7$ that collectively form leads 255 and are respectively connected to counting and pattern detection circuits $300_0$, $300_1$, ..., $300_6$ as well as to alignment selection circuit 400.

To provide a sufficiently large measurement sample, the measurement interval during which counting occurs is arbitrarily chosen to be 0.25 seconds which allows counting to occur over 14000 incoming ADPCM encoded bits. Other intervals can be chosen provided the counters used in circuit 200 are sized accordingly. In particular, prior to the occurrence of the first clock pulse, counter 230 is initialized with the value "a" (which for a 0.25 second measurement interval is the decimal value "14000" thereby providing a sample size of 14000 incoming ADPCM encoded bits) by a load pulse that is applied to the load ("L") input of this counter in order to load the value "a" appearing at its data inputs ($D_{IN}$) into the counter. Thereafter, each successive extracted 56 kHz clock pulse occurring on lead 153 decrements the contents of this counter by one. When the contents reach zero, counter 230 produces a pulse at its carry out ($C_O$) terminal which is applied, via leads 235, as a strobe pulse to the active low enable input (EN not) of binary decoders 220 and 250 to disable their operation, and to the output enable (OE) of each of circuits 300 to enable their outputs and thereby produce an appropriate control signal on leads 395 based upon the recovered alignment.

Figures 3, 3A:
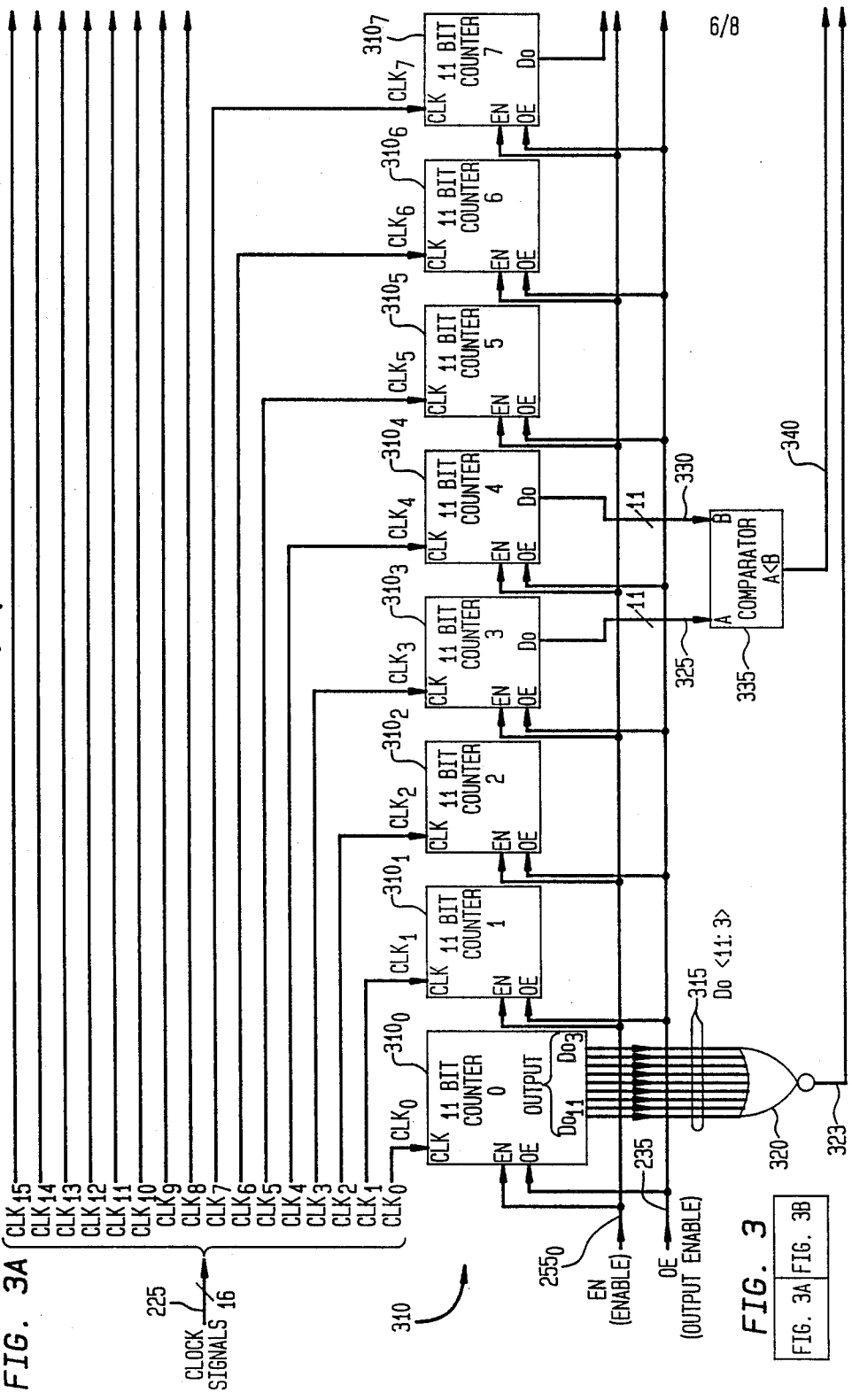
FIG. 3 shows the proper alignment of the drawing sheets for FIGS. 3A and 3B.
FIGS. 3A and 3B collectively depict a block diagram of a counting and pattern detection circuit, illustratively circuit $300_0$, that forms part of inventive septet alignment circuit 200 shown in FIGS. 2A–2D.
Figure 3B:
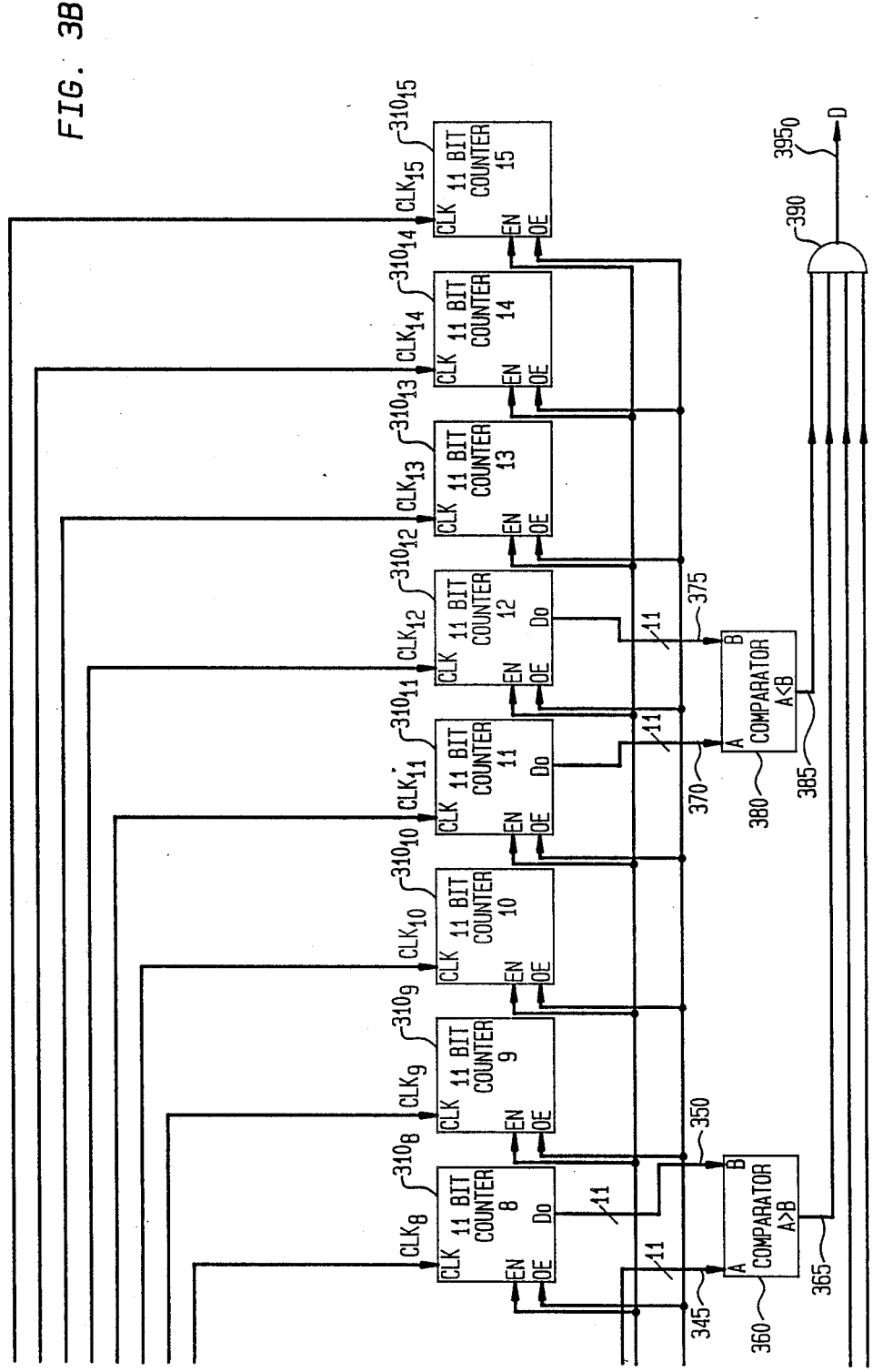

The discussion will now specifically address the counting and pattern detection circuits. As discussed, these circuits count the occurrences of each combination of the four most significant bits of each low-band ADPCM codeword for a given alignment and determine whether the distribution of the occurrences for that alignment satisfies pre-defined statistical tests. Since all the counting and detection circuits are identical, the following discussion, for purposes of brevity, will only address circuit $300_0$. A block diagram of one of counting and pattern detection circuits 300, illustratively circuit $300_0$ that detects alignment zero, is collectively depicted in FIGS. 3A and 3B; the proper alignment of the drawing sheets for these figures is shown in FIG. 3.

As depicted, circuit $300_0$ contains 16 11-bit counters 310, specifically counters $310_0, 310_1, \ldots, 310_{15}$. Each of these counters is connected to a different lead within clock leads 225 and is incremented by a 56 kHz clock pulse appearing thereon. In particular, clock leads $CLK_0, CLK_1, \ldots, CLK_{15}$ feed counters $310_0, 310_1, \ldots, 310_{15}$, respectively. As discussed above, the particular clock lead that carries a clock pulse is selected by the value of the currently occurring four bit combination. As such for alignment zero, each different four bit combination, when it occurs, increments a corresponding one of the 16 counters, i.e. counter $310_0$ (counter 0) for combination zero, counter $310_1$ (counter 1) for combination $1, \ldots,$ and counter $310_{15}$ (counter 15) for combination 15, by one. To count an occurrence, an enable pulse appearing over lead $255_0$ is routed in parallel to each of the 16 counters to simultaneously enable their operation, although only one of these counters is clocked by any given clock pulse. At the end of the measuring interval, an output enable (OE) pulse is applied, as discussed above, to lead 235. This pulse, routed in parallel to each of the 16 counters, causes each counter to transfer its internal contents to its data output ($D_O$) terminals in order to determine whether the distribution of occurrences contained within circuit $300_0$ satisfies all the pre-defined statistical tests. Specifically, these tests include determining whether the distribution is approximately zero for the combination zero, sharply decreases between the combinations 7 and 8, and monotonically increases elsewhere, e.g. illustratively between the combinations 3 and 4 and between the combinations 11 and 12. While more thorough monotonicity tests or other comparisons between the contents of different counters than those specifically used herein can be made, we have found that these four tests provide very satisfactory results. First, the contents of counter $310_0$ (counter 0) is tested to determine whether the number of occurrences of the zero combination is less than an arbitrary pre-defined threshold value, here the threshold value "8". Even though zero combinations should not occur in theory, in practice, these combinations could be generated within a septet as a result of bit errors that occur in the channel which change a "1" bit to "0" bit. Therefore, this threshold value is empirically chosen to compensate for expected noise on the line and hence the anticipated bit errors that might occur during the measurement interval. This test is accomplished by routing all the upper eight data output bits ($D_O<11:3>$) produced by counter $310_0$ and appearing over leads 315 to exclusive NOR gate 320. This gate will produce a high level on lead 323 if all of these bits are low, i.e. if the number of occurrences of the zero combination is less than eight. The next statistical test involves determining whether the number of occurrences for the combination 4 exceeds the number of occurrences for the combination 3. This test is performed by routing the 11-bit data outputs from counters $310_3$ (counter 3) and $310_4$ (counter 4) to respective "A" and "B" inputs of comparator 335. This comparator will produce a high level on lead 340 only if the contents in counter $310_4$ exceed those in counter $310_3$. The third statistical test involves determining whether the number of occurrences for the combination 7 exceeds the number of occurrences for the combination 8. This test is performed by routing the 11-bit data outputs from counters $310_7$ (counter 7) and $310_8$ (counter 8) to respective "A" and "B" inputs of comparator 360. This comparator will produce a high level on lead 365 only if the contents in counter $310_7$ exceed those in counter $310_8$. The fourth and last statistical test involves determining whether the number of occurrences for the combination 12 exceeds the number of occurrences for the combination 11. This test is performed by routing the 11-bit data outputs from counters $310_{11}$ (counter 11) and $310_{12}$ (counter 12) to respective "A" and "B" inputs of comparator 380. This comparator will produce a high level on lead 385 only if the contents in counter $310_{12}$ exceed those in counter $310_{11}$. To determine whether the distribution contained within circuit $300_0$ passed all four statistical tests, leads 323, 340, 365 and 385 are routed to respective inputs of AND gate 390. As such, if all four tests are satisfied, AND gate 390 will produce a high level on "D" output lead $395_0$ and a low level otherwise. In the embodiment shown, the contents of only seven counters (counters 0, 3, 4, 7, 8, 11 and 12) that exist within each of counting and pattern detection circuits 300 are actually used to test each of seven different measured distributions. As such, the number of counters that form each counting and pattern detection circuit can be reduced from sixteen to seven in order to decrease the number of counters in circuits 300 from 112 to 49. While decreasing the number of counters substantially reduces parts count, it also reduces circuit flexibility. Specifically, reducing the number of counters within each counting and pattern detection circuit to seven prevents more thorough monotonicity tests than merely three comparisons, as discussed above, from being used. Situations may arise, particularly where a minimal number of alignment errors is desired, which can only be obtained by using more thorough monotonicity tests, perhaps using the contents of all 16 counters.

FIG. 4 depicts a block diagram of alignment selection circuit 400 that forms part of inventive septet alignment circuit 200 shown in FIGS. 2A–2D. Circuit 400 determines if alignment was successfully recovered during the most recently concluded measuring interval. If alignment was successfully recovered, then this circuit, as discussed above, produces a pulse on lead 415 to indicate this condition and a properly phased 8 kHz signal on lead 475 for use as a framing signal. Alternatively, if alignment was not successfully recovered, then circuit 400, also as discussed above, produces either a pulse on lead 435 if no alignment was recovered or a pulse on lead 445 if multiple alignments were recovered, i.e. two or more alignments had corresponding distributions that each satisfied the four statistical tests.

As depicted, within alignment selection circuit 400 the control signals generated by counting and pattern detection circuits 300 (see FIGS. 2A–2D) and appearing on leads 395 are routed, as shown in FIG. 4, to respective inputs of seven input exclusive OR gate 410. This gate will produce a high level on leads 415 only if one lead within leads 395 is high, thereby indicating that only one alignment was found. To produce the 8 kHz framing signal, the control signals appearing on leads 395 are also fed to respective parallel data inputs ($I_0, I_1, \ldots, I_6$) of seven-bit register 450. The values of these signals are loaded into and appear at the output of this register at the occurrence of a pulse produced by gate 410. Each of the seven bits produced by register 450 is then gated with a corresponding phase of a multi-phase 8 kHz clock signal that has been delayed by an appropriate number of 56 kHz increments to produce a properly phased 8 kHz framing signal. Specifically, each of the seven parallel bits provided by register 450 is routed over leads 455 to a respective input of an AND gate within AND gates 460. In particular, output bits 0, 1, ..., 6 from register 450 are routed, via leads 455, to one input of AND gates $460_0$, $460_1$, ..., $460_6$, respectively. A corresponding phase of the 8 kHz clock signals appearing on leads 255 is applied to the other input to each of these gates. Specifically, clock signals $CLK_0$, $CLK_1$, ..., $CLK_6$ appearing over leads $255_0$, $255_1$, ..., $255_6$ are routed to one input of AND gates $460_0$, $460_1$, ..., $460_6$, respectively. The bit provided by register 450 that is high determines which one of the seven different phases of the 8 kHz clock is gated through AND gates 460. The outputs from all of AND gates 460 are combined in seven input OR gate 470. As such, gate 470 produces a gated 8 kHz clock signal on lead 475 as the 8 kHz framing signal that has a phase corresponding to the particular recovered septet alignment.

Gates 420, 428, 430 and 440 are used to detect the existence of an error condition, i.e. no alignment or multiple alignments. Specifically, to detect whether no alignment has been recovered, the control signals provided by leads 395 are routed to seven input OR gate 420. The output of this gate is combined, through NOR gate 430, with the output of exclusive OR gate 410 to produce a pulse on lead 435 if no alignment has been recovered. To detect whether two or more alignments have been recovered, the output of OR gate 420 is combined in AND gate 440 with the inverted output of exclusive OR gate 410, the latter being specifically produced by inverter 428. Whenever multiple alignments have been recovered, gate 440 provides a pulse on leads 445.

With this description in mind, the operation of the inventive septet recovery method can be appreciated by considering Table 4 below which shows the contents of counting and pattern detection circuits 300 for a typical 0.5 second interval of silence. Given the data in the table, alignments 0, 1 and 2 would not be selected by circuits 300 because an excessive number of the all zero (0000) combination occurred in their distributions. Of all the remaining alignments, alignment 5 possesses the only distribution that has increasing occurrence data between combinations 3 and 4, and between combinations 11 and 12 along with decreasing occurrence data between combinations 7 and 8. Hence, alignment 5 would be selected. Consequently, only circuit $300_5$, see FIGS. 2A–2D, located within counting and pattern recognitions circuits 300 would produce a high level on leads 395 and specifically only on lead $395_5$. No pulses would appear on any of the other leads within leads 395. As such, alignment selection circuit 400 would produce both a pulse on lead 415 to indicate that alignment was successfully found and an 8 kHz clock signal that is delayed by six 56 kHz clock increments as the framing signal on lead 475.

TABLE 4

| Combination | Measured Occurrence Data for .5 seconds of silence | | | | | | |
|---|---|---|---|---|---|---|---|
| | Alignment | | | | | | |
| | 0 | 1 | 2 | 3 | 4 | 5 | 6 |
| 0 (0000) | 24 | 12 | 10 | 0 | 1 | 0 | 0 |
| 1 (0001) | 78 | 156 | 17 | 20 | 6 | 1 | 6 |
| 2 (0010) | 42 | 177 | 93 | 8 | 29 | 6 | 4 |
| 3 (0011) | 187 | 390 | 262 | 31 | 239 | 2 | 3 |
| 4 (0100) | 80 | 13 | 90 | 1 | 4 | 22 | 7 |
| 5 (0101) | 304 | 220 | 292 | 221 | 26 | 90 | 10 |
| 6 (0110) | 109 | 240 | 218 | 19 | 267 | 361 | 12H |
| 7 (0111) | 413 | 580 | 708 | 589 | 393 | 649 | 53 |
| 8 (1000) | 144 | 15 | 10 | 7 | 0 | 6 | 102 |
| 9 (1001) | 489 | 199 | 22 | 248 | 2 | 6 | 223 |
| 10 (1010) | 191 | 205 | 129 | 22 | 83 | 11 | 380 |
| 11 (1011) | 633 | 536 | 346 | 629 | 771 | 63 | 519 |
| 12 (1100) | 134 | 19 | 165 | 1 | 8 | 303 | 627 |
| 13 (1101) | 437 | 255 | 359 | 633 | 48 | 809 | 814 |
| 14 (1110) | 165 | 284 | 416 | 37 | 845 | 1080 | 559 |
| 15 (1111) | 570 | 699 | 863 | 1534 | 1278 | 591 | 681 |

By now, those skilled in the art clearly realize that since the inventive alignment recovery technique relies on exploiting imperfections existing in the coding process, this technique is not limited to use with encoded signals having any particular number of bits, e.g. 7 bit audio digital signals. Moreover, this alignment technique is not limited to ADPCM but can be used with substantially any imperfect digital coding technique that provides an output distribution having a deterministic pattern for use in conveying encoded information over a digital channel of substantially any speed. For example, these signals can be formed of octets that occur at 64 KBit/second and contain an encoded ADPCM 8 kHz audio signal.

In addition, since the Integrated Services Digital Network (ISDN) presently being deployed provides end-to-end digital connections, use of the inventive alignment recovery technique in ISDN customer premise equipment (CPE) advantageously permits an ISDN network to easily carry 7 kHz audio. In this case, an appropriate signalling message, e.g. preferably in-band on an ISDN "D" channel, would need to be transmitted by the transmitting terminal equipment to the network in order to request the network to establish a 64 kbit/second connection between the transmitting and receiving ISDN CPE for the duration of a call and then the network would need to respond to this message accordingly.

Furthermore, even though inventive septet alignment circuit 200 has been shown as being implemented with discrete digital logic, the inventive technique could easily be implemented in software. Such an implementation could run on a microprocessor or other suitable digital processor in which each discrete counter would be replaced by a corresponding memory location. Alternatively, the inventive technique could be implemented in custom large scale integrated circuits, application specific integrated circuits or programmable logic arrays that contain onboard counters, decoders and multiplexers, or through other similar well known customizable circuits. With these circuits, the necessary inter-connections could be achieved through custom metallization layers or through electrical programmability.

Although a preferred embodiment of the present invention has been shown and described in detail herein, many other varied embodiments that incorporate the teachings of the present invention may be easily constructed by those skilled in the art.

We claim:

1. A method for recovering alignment of a multi-bit non-ideally encoded digital signal comprising the steps of:
   gathering statistics from a non-ideally encoded multi-bit digital signal, that occurs over a pre-defined measurement interval and for each one of a plurality of possible alignments of said encoded signal, and
   choosing one of said alignments of said signal which satisfies a plurality of pre-defined statistical tests, that are dictated by non-uniform deterministic characteristics which occur in the encoded signal when it is properly aligned, comprising the step of generating an error signal if after the conclusion of said measurement interval either no alignment is found that satisfies said plurality of pre-defined statistical tests of multiple ones of said alignments are found.

2. A method for recovering alignment of a multi-bit non-ideally encoded digital signal comprising the steps of:
   gathering statistics from a non-ideally encoded multi-bit digital signal, that occurs over a pre-defined measurement interval and for each one of a plurality of possible alignments of said encoded signal, comprising the steps of:
      counting occurrences of each different combination of bits that occurs within a pre-determined group of bits situated within codewords that collectively form said signal and which occur during said measurement interval so as to yield a separate count for each different combination; and
      separately counting said occurrences for each one of said alignments so as to yield a corresponding distribution of occurrences of said different combinations for each of said alignments; and
   choosing one of said alignments of said signal which satisfies a plurality of pre-defined statistical tests that are dictated by non-uniform deterministic characteristics which occur in the encoded signal when it is properly aligned. —.

3. The method in claim 2 wherein said alignment choosing step comprises the steps of:
   testing the distribution corresponding to each of said possible alignments after the conclusion of said measurement interval in order to determine which one of the distributions satisfies said pre-defined statistical tests; and
   generating, in response to said one distribution, a clock signal having a phase corresponding thereto for use in properly aligning said digital signal.

4. The method in claim 3 wherein said clock signal generating step comprises the step of producing a clock signal having a clock pulse that is appropriately delayed by a pre-defined number of increments and wherein said number corresponds to said one distribution.

5. The method of claim 4 wherein said alignment choosing step further comprises the step of generating an error signal if after the conclusion of said measurement interval either no alignment is found that satisfies said plurality of the pre-defined statistical tests or if multiple ones of said alignments are found.

6. The method in claim 3 wherein the digital signal is an encoded pulse code modulated (PCM) signal.

7. The method in claim 6 wherein the digital signal is a sub-band encoded adaptive differential pulse code modulated (ADPCM) 7 kHz audio digital signal formed of a series of septets and wherein each septet contains a two-bit high-band ADPCM codeword and a five-bit low-band ADPCM codeword. —.

8. The method in claim 7 wherein said pre-determined group comprises the four most significant bits of each low-band ADPCM codeword.

9. The method in claim 8 wherein said clock signal generating step comprises the step of producing an 8 kHz clock signal having a clock pulse that is appropriately delayed by a requisite number of 56 kHz increments and wherein said number corresponds to said one distribution.

10. The method in claim 9 wherein said alignment choosing step further comprises the step of generating an error signal if after the conclusion of said measurement interval either no alignment is found that satisfies said plurality of the pre-defined statistical tests or if multiple ones of said alignments are found.

11. The method in claim 3 wherein said distribution testing step comprises the steps of:
    determining whether, for a first pre-defined combination, the distribution has a number of occurrences that is less than a pre-defined threshold value;
    determining whether, from a second pre-defined combination to a third pre-defined combination, the number of occurrences in the distribution decreases; and
    determining whether, from a fourth pre-defined combination to a fifth pre-defined combination, the number of occurrences in the distribution increases.

12. The method in claim 11 wherein said first, second and third pre-defined combinations have the decimal values 0, 7 and 8, respectively.

13. The method in claim 12 wherein said distribution testing step further comprises the step of determining whether, from a sixth pre-defined combination to a seventh pre-defined combination, the number of occurrences in the distribution increases; and wherein said fourth, fifth, sixth and seventh combinations have the decimal values 3, 4, 11 and 12, respectively.

14. Apparatus for recovering alignment of a multi-bit non-ideally encoded digital signal comprising:
    means for gathering statistics from a non-ideally encoded multi-bit digital signal, that occurs over a pre-defined measurement interval and for each one of a plurality of possible alignments of said encoded signal; and
    means for choosing one of said alignments of said signal which satisfies a plurality of pre-defined statistical tests, that are dictated by non-uniform deterministic characteristics which occur in the encoded signal when it is properly aligned, comprising means for generating an error signal if after the conclusion of said measurement interval either no alignment is found that satisfies said plurality of pre-defined statistical tests or multiple ones of said alignments are found.

15. Apparatus for recovering alignment of a multi-bit non-ideally encoded digital signal comprising:
    means for gathering statistics from a non-ideally encoded multi-bit digital signal, that occurs over a pre-defined measurement interval and for each one of a plurality of possible alignments of said encoded signal, comprising:

means for counting occurrences of each different combination of bits that occurs within a pre-determined group of bits situated within codewords that collectively form said signal and which occur during said measurement interval so as to yield a separate count for each different combination; and means for separately counting said occurrences for each one of said alignments so as to yield a corresponding distribution of occurrences of said different combinations for each of said alignments; and means for choosing one of said alignments of said signal which satisfies a plurality of pre-defined statistical tests that are dictated by non-uniform deterministic characteristics which occur in the encoded signal when it is properly aligned.

16. The apparatus in claim 15 wherein said alignment choosing means comprises:

means for testing the distribution corresponding to each of said possible alignments after the conclusion of said measurement interval in order to determine which one of the distributions satisfies said pre-defined statistical tests; and means for generating, in response to said one distribution, a clock signal having a phase corresponding thereto for use in properly aligning said digital signal.

17. The apparatus in claim 16 wherein said clock signal generating means comprises means for producing a clock signal having a clock pulse that is appropriately delayed by a pre-defined number of increments and wherein said number corresponds to said one distribution.

18. The apparatus of claim 17 wherein said alignment choosing means further comprises means for generating an error signal if after the conclusion of said measurement interval either no alignment is found that satisfies said plurality of the pre-defined statistical tests or if multiple ones of said alignments are found.

19. The apparatus in claim 16 wherein the digital signal is an encoded pulse code modulated (PCM) signal.

20. The apparatus in claim 19 wherein the digital signal is a sub-band encoded adaptive differential pulse code modulated (ADPCM) 7 kHz audio digital signal formed of a series of septets and wherein each septet contains a two-bit high-band ADPCM codeword and a five-bit low-band ADPCM codeword. —.

21. The apparatus of claim 20 wherein said pre-determined group comprises the four most significant bits of each low-band ADPCM codeword.

22. The apparatus in claim 21 wherein said clock signal generating means comprises means for producing an 8 kHz clock signal having a clock pulse that is appropriately delayed by a requisite number of 56 kHz increments and wherein said number corresponds to said one distribution.

23. The apparatus in claim 22 wherein said alignment choosing means further comprises means for generating an error signal if after the conclusion of said measurement interval either no alignment is found that satisfies said plurality of the pre-defined statistical tests or if multiple ones of said alignments are found.

24. The apparatus in claim 16 wherein said distribution testing means comprises:

first means for determining whether, for a first pre-defined combination, the distribution has a number of occurrences that is less than a pre-defined threshold value;

second means for determining whether, from a second pre-defined combination to a third pre-defined combination, the number of occurrences in the distribution decreases; and third means for determining whether, from a fourth pre-defined combination to a fifth pre-defined combination, the number of occurrences in the distribution increases.

25. The apparatus in claim 24 wherein said first, second and third pre-defined combinations have the decimal values 0, 7 and 8, respectively.

26. The apparatus in claim 25 wherein said distribution testing means further comprises means for determining whether, from a sixth pre-defined combination to a seventh pre-defined combination, the number of occurrences in the distribution increases; and wherein said fourth, fifth, sixth and seventh combinations have the decimal values 3, 4, 11 and 12, respectively.

* * * * *